Aug. 4, 1931.  H. S. TAYLOR  1,817,429
APPARATUS FOR GATHERING AND FEEDING IN CROP TO STRIPPER
HARVESTING AND REAPER THRASHER MACHINES
Filed Oct. 5, 1928   3 Sheets-Sheet 2

H. S. Taylor
INVENTOR

By: Marks & Clerk
Attys

Aug. 4, 1931. H. S. TAYLOR 1,817,429
APPARATUS FOR GATHERING AND FEEDING IN CROP TO STRIPPER
HARVESTING AND REAPER THRASHER MACHINES
Filed Oct. 5, 1928 3 Sheets-Sheet 3

H. S. Taylor
INVENTOR

By: Marks & Clark
Attys.

Patented Aug. 4, 1931

1,817,429

UNITED STATES PATENT OFFICE

HEADLIE SHIPARD TAYLOR, OF SUNSHINE, VICTORIA, AUSTRALIA, ASSIGNOR TO H. V. McKAY PROPRIETARY LIMITED, OF SUNSHINE, AUSTRALIA

APPARATUS FOR GATHERING AND FEEDING IN CROP TO STRIPPER HARVESTING AND REAPER THRASHER MACHINES

Application filed October 5, 1928, Serial No. 310,603, and in Australia December 23, 1927.

This invention relates to improvements in and connected with apparatus for gathering and feeding in crop to stripper harvesting and reaper-thrasher machines and refers especially to apparatus for gathering standing crop in advance of the comb and feeding it rearwardly thereover into the path of movement of rotary beaters or a knife situated in advance of a transverse conveyor or conveyors.

The object of the present invention is to provide a simple and durably constructed apparatus which will operate efficiently to gather the crop in advance of a comb without thrashing the heads thereof, and direct it rearwardly thereover to a rotary beater or a reaping knife in such a way as to prevent choking of the comb and loss of grain.

I accomplish the abovementioned object by mounting a batten or blade rigidly on the front ends of arms associated with and acted upon by cranks or eccentrics to impart forward and rearward movements to the arms and batten, and constraining members or guides associated with or connected to the arms whereby the batten in its rearward movement will feed the crop into and over the comb and when adjacent to the stripper or reaping mechanism at the base of the comb will move upwardly at an angle and again enter the crop in advance thereof.

The invention comprises means for adjustably supporting the operative parts of the apparatus whereby it can be readily adapted to particular requirements and the driving mechanism may embody means for throwing the apparatus into and out of action as and when required.

In order that the invention may be readily understood reference will now be had to the accompanying sheets of explanatory drawings wherein :—

Figure 1:
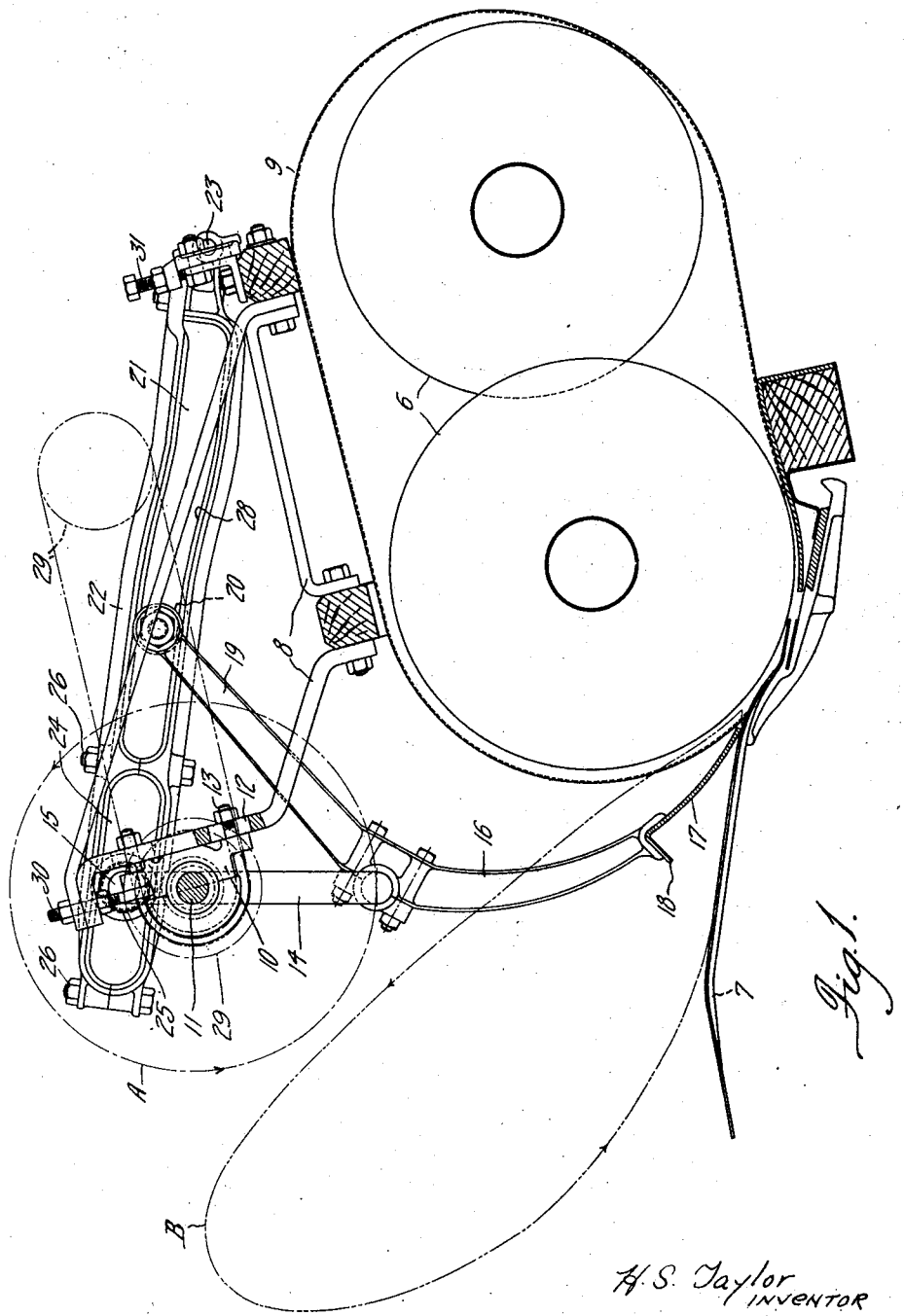
Figure 1 is a view in sectional side elevation of portion of the crop gathering and conveying mechanism of a reaper thrasher machine fitted with improvements constructed in accordance with the present invention.

In these drawings wherein a practical embodiment of the invention is shown as adapted for use with a reaper thrasher having a pair of helical transverse conveyors 6 at the base of a comb 7, a series of brackets 8 is fitted to and projects forwardly from the top of the casing 9 of the conveyor.

The front end of each bracket 8 supports a bearing 10 on which is rotatively supported a transverse shaft 11 and the said bearings are adapted to be adjusted vertically by means of slots 12 in the brackets 8 and fastening bolts 13. The shaft 11 is provided at different points in its length with opposed cranks 14 and 15, the former of which are considerably larger than the latter.

A curved arm 16 is pivotally mounted on each of the long cranks 14 and the forward ends of the said arms are fitted to the upper edge of a batten or blade 17 which extends the full length of the comb.

The batten 17 may be formed of sheet metal with a slight curvature when viewed in end elevation (see Figure 1) or it may be given any other approved shape in cross section. The batten preferably is formed with a stiffening rib 18 along its upper edge in order to impart a desired degree of rigidity and to enable it to resist reasonable strains without twisting or bending.

Figure 2:
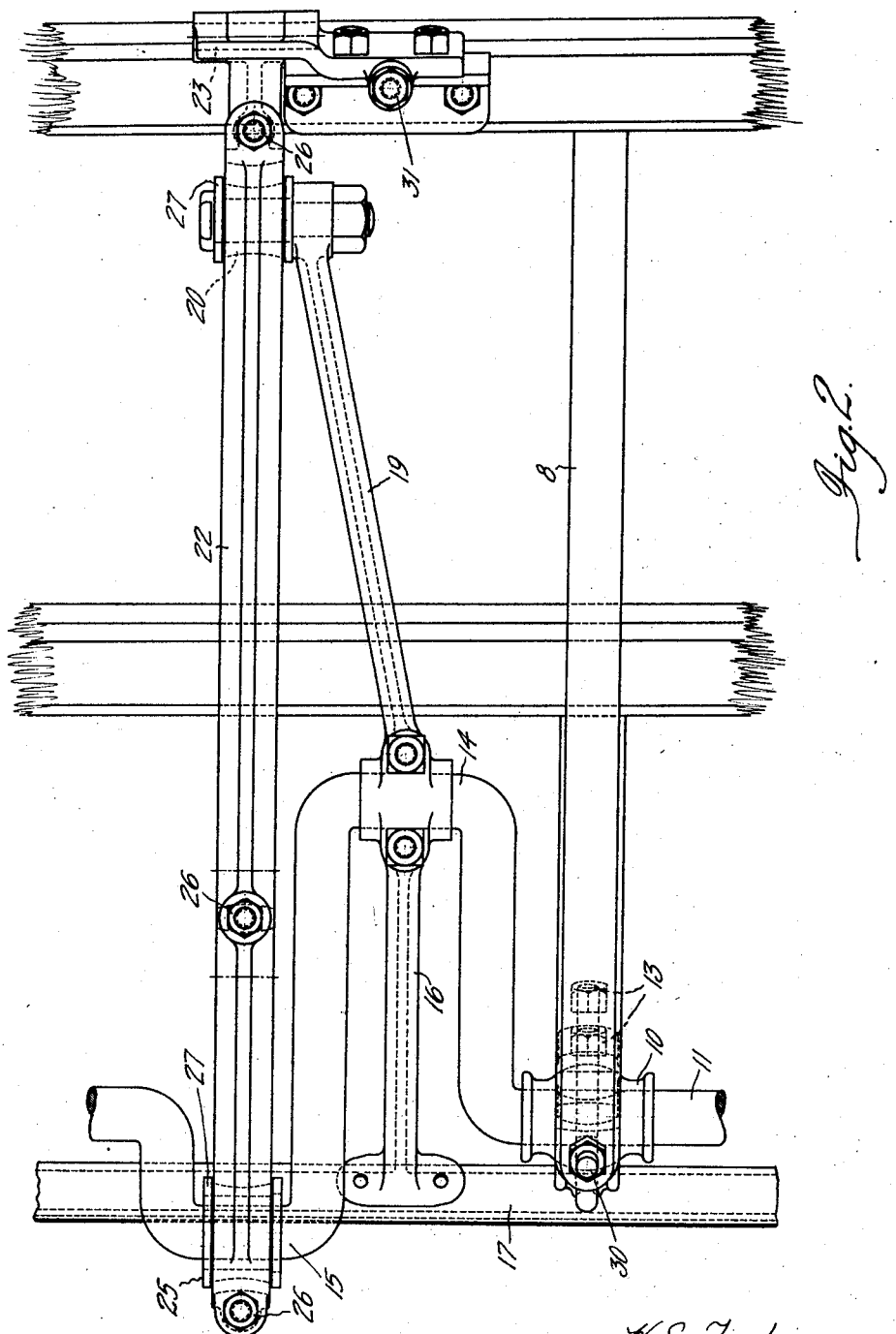
Figure 2 is a view in plan of portion of Figure 1.

The pivoted ends of the arms 16 are provided with rearward extensions 19 which are off-set as shown in Figure 2 of the drawings and provided at their rear ends with rollers 20 which are adapted to traverse a guide slot 21 in an oscillating member 22 having its rear end pivotally supported on a pivot pin 23 carried by a bracket adjustably supported above the rear of the casing 9.

The forward end of the oscillating member 22 is provided with a guide slot 24 which is adapted to accommodate a roller 25 carried by the short crank 15, and, if preferred, the oscillatable member can be made in two parts and clamped together by means of bolts 26 whereby the parts may be assembled readily on the rollers.

The rollers 20 and 25 preferably are grooved or provided with end flanges 27 whereby lateral displacement of the rearward extension on the arms 16 and the forward part of the oscillatable member will be obviated and freedom of movement of the parts will be assured.

The guide slots 21 may be curved downwardly as at 28 in order to ensure the batten moving in a desired path.

It will be obvious that the transverse shaft 11 can be provided with two or more sets of cranks 14 and 15 and associated parts and that they can be arranged in the positions found most suitable in practice.

The shaft 11 may be rotated as by chain and sprocket gearing 29 (indicated by dotted lines in Figure 1) or by any other approved means whereby the crank 14 and batten will move in the paths indicated by the dotted lines A and B respectively.

The vertical adjustment of the bearings 10 and pivot pin 23 by means of the bolts and slots and adjustment screws 30 and 31 may be adjusted whereby the batten will move correctly over the comb so as to effect the feeding in of the crop to the transverse conveyor 6 and to remove any material which may become choked between the fingers of the said comb.

The cranks 14 and 15 on the transverse shaft 11 and the connections between the said cranks and arms and the oscillatively mounted members cause the batten 17 to be projected rearwardly over and close to the comb and to take the path indicated by the chain dotted line B (see Figure 1) which will facilitate the feeding in of the crop at the base of the comb.

The constraining effect of the shorter cranks 15 and their connections with the rearward extensions 19 through the medium of the oscillatable members 22 causes the lower edge of the batten to be held stationary for a moment when it reaches its innermost point of travel over the comb and the upper edge to feather rearwardly prior to passing upwardly close to the front of the transverse conveyor 6.

During the upward movement of the batten the forward ends of the arms move upwardly in advance of the oscillatable members and cause the batten to feather forwardly and in its outward and downward movement it feathers downwardly so as to enter the crop more or less edgewise. The batten in its rearward movement passes close to the top of the comb for the whole or greater part of those portions of the fingers situated at the rear of the tapered points and prevents straw and other growth becoming jammed between the said fingers.

By suitably locating the bearings 10, and altering the sizes of the cranks 14 and 15 and the lengths of the rearward extensions 19, the path of the batten may be varied to suit different machines or combs.

It will be obvious that the transverse shaft 11 can be made in two or more independent sections and that the arms on each section can be provided with a batten and constraining means similar to those hereinbefore described.

When the transverse shaft and batten are formed of two or more independent sections, the different sections of the batten can be arranged to move one in advance of the other so that the whole length of the comb is not operated on at the one time. Each section of the batten carrying mechanism is provided with separate driving gear and with clutch mechanism when desired.

Figure 3:
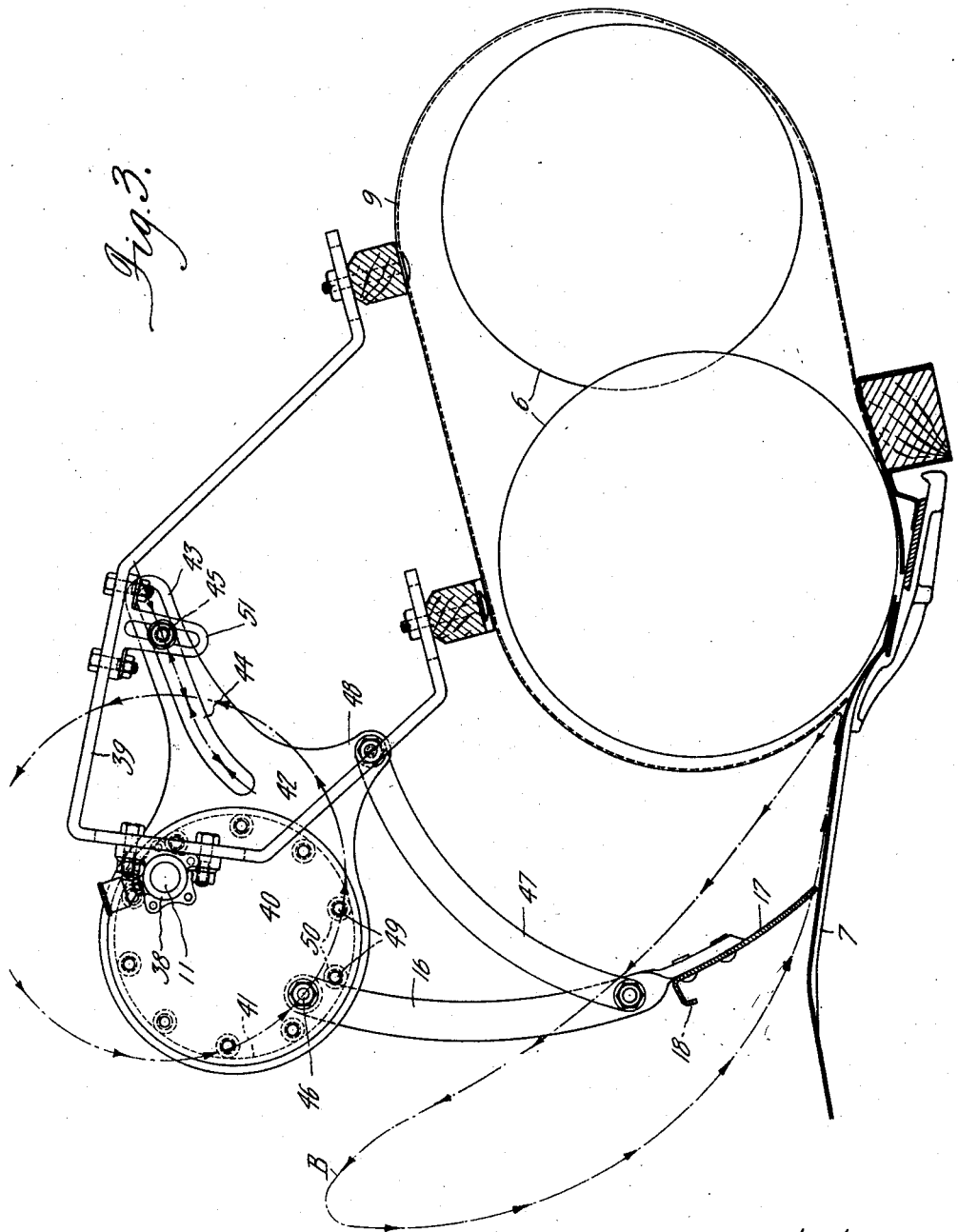
Figure 3 is a view in sectional side elevation illustrating a modified form of the invention.

In the modification of the invention illustrated in Figure 3 of the drawings the transverse shaft 11 is mounted near its ends in bearings 38 adjustably supported on brackets 39 fitted to the adjustable frame of the machine or upon the casing 9 supporting a reel or transverse conveyor. Each end of the shaft is fitted with an eccentric 40 which is adapted to rotate freely in a hole 41 in an oscillatable member 42 having a rearward extension 43 formed with a slot 44 having a downwardly curved front end and which is adapted to engage a roller 45 adjustably supported on the bracket at the rear of the shaft.

The slot 44 in the rearward extension on the oscillatable member 42 is shaped so as to ensure the batten carried by the arms 16 pivoted to the eccentrics following a correct path.

The rear ends of the arms 16 carrying the battens are pivoted to studs 46 on the outer faces of the eccentrics at a point diametrically opposite the transverse shaft 11 and the arms at a point adjacent to the battens are connected by links 47, to lugs 48 depending from the oscillatable member at the rear of and below the said shaft.

The eccentric may be provided with series of laterally projecting pins 49 supporting rollers 50 which are adapted to rotate freely in the circular hole formed in the oscillatingly mounted member and the roller 45 engaged by the slot 44 in the rearward extension of the said member is adapted to be adjusted vertically in a slotted member 51 on the bracket whereby the path of movement of the batten can be adjusted as required.

The forward ends of the members 42 are oscillated upon the rotation of the eccentrics 40 and the lugs 48 to which the links 47 are connected are so disposed that the links will constrain the movement of the arms supporting the batten whereby the said batten will be passed edgewise into the crop and rearwardly close to or in contact with the upper surface of the comb fingers until they reach the inner end thereof at which point the batten will be caused to feather rearwardly and moved upwardly at a more obtuse angle and nearer to the transverse shaft than in its descent when again entering the crop.

It will be obvious that the transverse shaft 11 can be made in two or more independent sections and that the arms on each section can be provided with a batten.

When the transverse shaft and batten are formed of two or more independent sections, the different sections of the batten can be arranged to move one in advance of the other so that the whole length of the comb is not being operated on at the one time.

The adjustment provided by the different parts of the invention are essential in view of the fact that harvesting machines are not made with a great degree of accuracy and provision must therefore be made for adjusting the parts of the invention to ensure the best results being obtained from each machine.

I claim:—

1. In apparatus for gathering and feeding in crop to and over the comb of stripper harvesting and reaper thrasher machines, a shaft rotatively mounted above the level of the comb, eccentrically disposed elements fitted to the said shaft, arms pivotally mounted on the eccentrically disposed elements, oscillatively mounted guiding elements, actuated by the eccentric elements on the shaft, movable connections between the guiding elements and the arms, and a batten supported on the forward ends of the arms, whereby the rotation of the eccentric elements will cause the arms to be thrust out and to be drawn inwardly and the connections between the arms and the guiding elements will constrain the movement of the batten whereby it will be caused to move rearwardly with its rear edge in contact with or close to the comb to free the same of any material jammed between the fingers thereof and to feed the material thereover.

2. In apparatus for gathering and feeding in crop to and over the combs of stripper harvesting and reaper thrasher machines, a shaft rotatively mounted above the comb, gearing for imparting rotation to the shaft, long and short cranks on the shaft, arms pivotally mounted to the long cranks, a batten supported on the front ends of the arms, oscillatively mounted guide members engaging the short cranks, and rearward extensions on the arms movably connected to the oscillatively mounted guide members.

3. In apparatus for gathering and feeding in crop to and over the combs of stripper harvesting and reaper thrasher machines, a shaft rotatively mounted above the comb, gearing for imparting rotation to the shaft, cranks on the shaft arranged at 180° to each other, arms pivotally mounted on the cranks on one side of the shaft, a batten fitted to the forward ends of the arms, slotted guide members oscillatively mounted at the rear of the shaft and a movable connection between the rearward extensions of the arms and the slotted guide members.

4. In apparatus for gathering and feeding in crop to and over the combs of stripper harvesting and reaper thrasher machines, adjustable brackets, bearings on the adjustable brackets, a shaft rotatively mounted in the brackets above the comb, gearing for imparting rotation to the shaft, two or more pairs of long and short cranks on the shaft arranged at 180°, arms pivotally mounted on the long cranks oscillatively mounted guide members engaging the short cranks, off-set rearward extensions on the arms, rollers fitted on the extension of the arms and engaged by slots in the oscillatively mounted guide members and downwardly curved portions in the slots in the oscillatively mounted guide members engaging the rollers on the rearward extensions of the arms.

5. In apparatus for gathering and feeding in crop to and over the combs of stripper harvesting and reaper thrasher machines, a shaft rotatively mounted above the level of the comb, eccentrics fitted to the shaft, oscillatable members having holes in their forward ends neatly embracing the eccentrics, slots in the rear ends of the oscillatable members engaging fixed studs, crank pins on the sides of the eccentrics, arms having their rear ends pivotally mounted on the crank pins, a batten fitted to the forward ends of the arms, and link connections between the arms and the oscillatable members supported on the eccentrics and studs.

6. Apparatus for gathering and feeding crop to and over the comb of a stripper harvesting or reaper thrasher machine, comprising a rotatively mounted shaft having eccentric members thereon, batten carrying arms pivotally mounted on the eccentric members, oscillatively mounted slotted guide members associated with the eccentric members, and movable connections between the batten carrying arms and the oscillatively mounted guide members.

7. Apparatus according to claim 6, wherein the rear ends of the slotted guide members are mounted on adjustable pivot pins, and the bearings for the transverse shaft are provided with means for effecting a vertical adjustment of the same.

In witness whereof I hereunto affix my signature.

HEADLIE SHIPARD TAYLOR.